United States Patent [19]
Cook et al.

[11] 3,808,594
[45] Apr. 30, 1974

[54] MULTIPLICATIVE SIGNAL PROCESSOR FOR TARGET DETECTION SYSTEMS
[75] Inventors: Charles E. Cook, Carlisle, Mass.; Stanley E. Bogotch, Los Angeles, Calif.
[73] Assignee: Sperry Rand Corporation, New York, N.Y.
[22] Filed: Mar. 17, 1971
[21] Appl. No.: 125,420

[52] U.S. Cl..................... 343/17.2 R, 343/17.2 PC, 343/100 CL
[51] Int. Cl. ........ G01s 7/28, G01s 7/30, G01s 9/02
[58] Field of Search... 343/17.2 R, 17.2 PC, 100 CL

[56] References Cited
UNITED STATES PATENTS
3,374,478  3/1968  Blau............................ 343/100 CL
3,261,969  7/1966  Routh.......................... 343/17.2 PC
3,500,403  3/1970  Fuller.......................... 343/17.2 R X
3,157,781  11/1964  Green.......................... 343/100 CL
3,134,896  5/1964  Briggs.......................... 343/100 CL
3,060,425  10/1962  Cutler.......................... 343/17.2 R X
3,380,054  4/1968  Cook............................ 343/17.2 PC Primary Examiner—Malcolm F. Hubler
Attorney, Agent, or Firm—S. C. Yeaton; Howard P. Terry

[57] ABSTRACT

Apparatus for processing return signals in target detection systems that transmit composite signals comprising components having range-Doppler ambiguities that are not time coincident. The signal processor comprises matched filters responsive to return signals reflected from targets and matched to the respective components of the composite signals. The outputs of the matched filters are applied as inputs to multiplying means which in turn provides an output signal substantially free of range and Doppler ambiguities.

13 Claims, 10 Drawing Figures

INVENTORS
CHARLES E. COOK
STANLEY E. BOGOTCH
BY
ATTORNEY

○ — OFF-DOPPLER TARGETS
◌ — FALSE TARGETS CAUSED BY CONVENTIONAL LINEAR PROCESSING
⌽ — FALSE TARGETS CAUSED BY MULTIPLICATIVE PROCESSING $\Delta f_d$ = 20 DOPPLER CELLS
$\Delta t$ = 20 RANGE CELLS

MULTIPLICATIVE SIGNAL PROCESSOR FOR TARGET DETECTION SYSTEMS

BACKGROUND OF THE INVENTION

1. Field of the Invention

The invention pertains to apparatus for processing return signals in target detection systems such as radar and sonar systems.

2. Description of the Prior Art

It is recognized that in radar and sonar applications, particularly with regard to defensive systems, the capability to detect and unambiguously resolve single targets, multiple targets and targets in distributed clutter are system desiderata. Furthermore, because of the high velocity of offensive weapons, the radar or sonar must achieve true target detection very rapidly and at sufficiently long ranges. Detection should preferably be achieved after a single transmission. These severe requirements have resulted in radar waveforms and signal processing techniques that attempt to resolve multiple targets simultaneously in range and Doppler by means of the return from a single transmission.

A known technique for evaluating the effectiveness of radar waveforms is by utilization of the radar ambiguity function. A detailed discussion of the ambiguity function may be had in the textbook, "Radar Signals," by C. E. Cook and M. Bernfield, published in 1967 by the Academic Press, pages 56-108. The ambiguity function is also described in the textbook, "Introduction to Radar Systems," by M. I. Skolnick, published in 1962 by the McGraw-Hill Book Company, Inc., pages 485-492. The ambiguity function describes the radar receiver matched filter output response due to the return from a single point target having any arbitrary Doppler velocity. The shape of the ambiguity function is dependent only on the transmitted waveform. Since the radar output response due to multiple targets can be obtained by the linear superposition of ambiguity functions, the capability of a radar to resolve multiple targets in range and Doppler on a single pulse is determined by the waveform.

To obtain simultaneous and unambiguous resolution of multiple targets in range and Doppler, the ambiguity function ideally should comprise a two-dimensional impulse located at the true range and Doppler of each of the targets. Thus an array of filters matching all possible Doppler shifts would have as outputs, impulses at the ranges of targets having only the specific Doppler velocity to which each filter is tuned. This ideal condition is impossible to attain for finite energy signals as a result of the known constraints which exist for matched filter systems. Two prior art approaches to achieving practical range-Doppler resolution are to utilize waveforms that have ambiguity functions with either a "spike" shape over a limited region of the range-Doppler plane or a "thumbtack" shape, i.e. a spike atop a uniformly low pedestal.

An approach to obtaining a spike shaped ambiguity function over a limited region of range and Doppler is to utilize a uniform pulse burst as the radar transmission. The corresponding ambiguity function has a spike at the range-Doppler location of a target and is substantially free of ambiguities in range for an interval equal to the interpulse spacing on either side of the main response. The ambiguity function is also relatively free of ambiguities in Doppler for an interval of Doppler shift equal to the reciprocal of the interpulse spacing. Beyond these intervals, large numbers of ambiguities of substantial magnitude occur. Thus, when the interpulse spacing of the radar transmission can be chosen to provide an ambiguity free area in the range-doppler plane with dimensions large enough to accommodate the expected spread in range and velocity of targets, the pulse burst waveform may be useful. However, in modern multiple target radar environments where target velocities tend to be exceedingly high and the necessary detection ranges very large, the pulse burst waveform usually provides an adversely large number of substantial magnitude ambiguities. In addition, this waveform has short-comings with regard to energy per transmission interval when peak power is limited resulting in a smaller signal-to-noise ratio at the receiver output compared to that provided by a long pulse.

Two classes of waveforms known to provide thumbtack shaped ambiguity functions are analog frequency modulated (FM) waveforms where the carrier is swept in accordance with a variety of functions such as parabolic or multiple segment functions, and noise-like waveforms such as random frequency-step dithered pulse train, binary null sequence, or pseudo-random signals. The first class of signals is discussed in detail on pages 86-100 of the said Cook and Bernfeld textbook and the latter class of signals is generally discussed in Chapter 8 of said text. Although, these waveforms provide fairly good approximation to the thumtack-shaped ambiguity function, the large numbers of substantial magnitude ambiguities existing throughout the range-doppler plane tend to obviate the usefulness of these waveforms in the practical radar systems utilized prior to the present invention. Particularly with regard to the linear FM pulse and the V-FM pulse waveforms, as described in said Cook and Bernfeld textbook, the adverse ambiguity responses thereof are illustrated in FIGS. 4.13 and 4.15 therein, respectively.

SUMMARY OF THE INVENTION

The disadvantages of prior art systems such as those discussed above are obviated in accordance with the present invention by transmitting composite signals having components with ambiguities that do not overlap in time. Signals such as the multiple segment linear FM waveform discussed above or signals comprising a plurality of pulse bursts of different pulse repetition frequencies may be utilized. Enhancing circuits responsive to the composite signals are matched to the respective signal components thereof. The outputs of the enhancing circuits are applied to a multiplying circuit which provides the true target responses with the ambiguities removed. Thus spike-like response functions over large regions of the range-Doppler plane are obtained.

DESCRIPTION OF THE PREFERRED EMBODIMENTS

Figure 1:
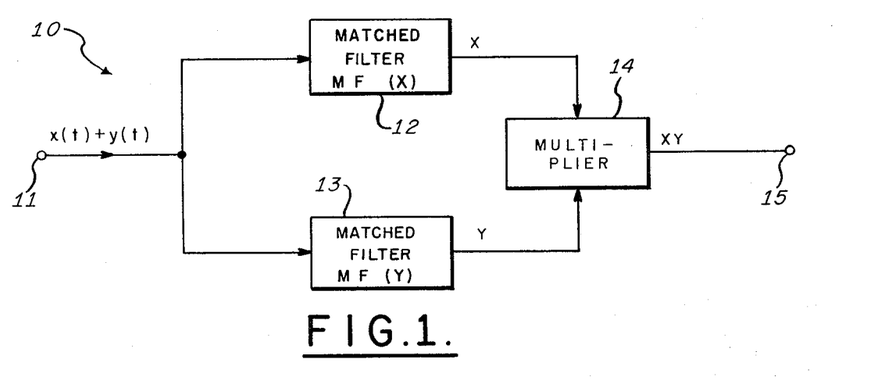
FIG. 1 is a schematic representation of apparatus embodying the underlying concept of the present invention.

FIG. 1 depicts a schematic representation of a signal processor 10 illustrating the underlying concept of the invention. The signal processor 10 may be utilized in a target detection system such as a radar system in which a composite waveform is transmitted. The transmitted waveform comprises a plurality of sub-waveforms or components such that the ambiguities associated with one component are substantially non-coincident in time with the ambiguities of any other component. For purposes of explanation, the invention will be described in terms of a composite signal comprising, for example, two components. The transmitted composite signal, after reflection front targets within the range of the radar system, are received by the radar receiver as return echo signals. The return echo signals, after conventional processing in the radar RF and IF stages, are applied to a terminal 11 of the signal processor 10. The return composite signal may be designated as $(x(t) + y(t))$, as indicated by the legend, where $x(t)$ and $y(t)$ are the components that comprise the composite signal. The composite signal applied to the terminal 11 is in turn applied as inputs to enhancing circuits 12 and 13. The enhancing circuits 12 and 13 may, for example, comprise matched filters or pulse compression networks matched respectively to $x(t)$ and $y(t)$. Generally the circuits 12 and 13 need not be matched exactly to $x(t)$ and $y(t)$. For example, they may be matched except with respect to Doppler shifts of the components $x(t)$ and $y(t)$.

The outputs of the enhancing circuits 12 and 13 designated as $x$ and $y$, respectively, are applied as inputs to a multiplier 14. The signal X is representative of the ambiguity function of $x(t)$ plus the cross-ambiguity associated with $y(t)$ applied to a filter matched to $x(t)$. The signal Y is similarly representative of the ambiguity function of $y(t)$ plus the cross-ambiguity associated with $x(t)$ applied to a filter matched to $y(t)$. The multiplier 14 provides the product of the signals X and Y at a terminal 15 as indicated by the legend XY. It is appreciated that for non-time coincident ambiguities at X and Y, the output at the terminal 15 will be zero. Thus, by choosing the components $x(t)$ and $y(t)$ such that their ambiguity distributions are non-coincident over large regions of the range-Doppler plane and their cross-ambiguities are of small magnitude, a significant reduction in ambiguity is effected when utilizing the present invention. It is appreciated that the multiplicative processor 10 is connected in a radar system to receive signals from the radar receiver front end at the terminal 11 and to provide signals to the video portion of the receiver from the terminal 15.

To evaluate the performance achievable with the multiplicative processor 10 for a particular composite waveform, $(x(t) + y(t))$, a function similar to the ambiguity function is defined. This function may be designated the resolution function and indicated by the symbol $R_\pi$ $(t, \omega_d)$. The resolution function is formed by combining the contours obtained from the output response to the composite waveform of a single point target for any and all Doppler shifts. Thus, in a manner similar to the ambiguity function, the resolution function describes the system output due to a single target with an arbitrary Doppler shift. The resolution function, therefore, is useful in determining the accuracy and resolution obtainable with the multiplicative processor of the present invention and is a measure of the effectiveness thereof in removing ambiguities.

It should be noted that the resolution function differs from the ambiguity function in that for conventional matched filter systems using the ambiguity function, the system output response due to multiple targets can be ascertained by the linear superposition of ambiguity functions. However, for the multiplicative processor of the present invention, the multiple target response is not directly obtainable through use of the resolution function. In order so to determine the multiple target response, the inputs X and Y to the multiplier 14 must be examined for time coincident ambiguities for a specific array of targets. An undesired output occurs only when the ambiguity from the matched filter 12 associated with a target overlaps multiple time the ambiguity from the matched filter 13 associated with another target. Thus the effectiveness of ambiguity removal for the multiplicative processor of the present invention is accurately determined by examining the system output responses for various specific range-Doppler distributions of multiple targets and comparing these output to what could be attained with the linear processing of the prior art. The resolution function $R_\pi$ $(t, \omega_d)$ will now be employed to show how the multiplicative processor of the present invention is used with specific composite waveforms to markedly reduce the ambiguities commonly encountered when mutliple targets are processed in prior art matched-filter systems. Waveforms such as linear FM pulses that have ambiguities confined to narrow areas of the range-doppler plane are best suited to practicing the invention.

Figure 2:
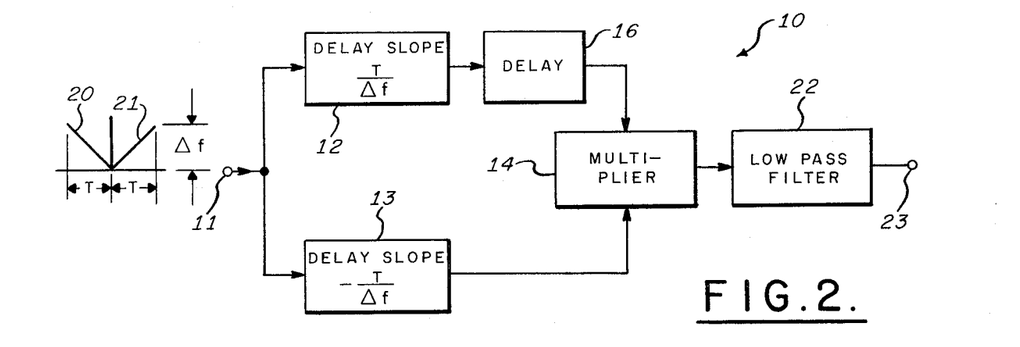
FIG. 2 is a block schematic representation of an embodiment of the invention for use with the V-FM waveform.

Referring to FIG. 2 in which like reference numerals designate like components with respect to FIG. 1, a block schematic representation of an embodiment of the invention utilizing the V-FM waveform is illustrated. The transmitted V-FM waveform is similar to that described in the said Cook and Bernfeld textbook on pages 96–100. The transmitted waveform is a rectangular pulse modulated RF carriers where the carrier frequency is linearly swept downwardly from a first frequency to a second frequency in a time T over a frequency range $\Delta f$ in accordance with the segment 20. The carrier is then swept linearly upwardly from the second frequency back to the first frequency again over the interval T and the frequency range $\Delta f$ in accordance with the segment 21 to complete the transmitted pulse.

The target echo returns are applied to the terminal 11 in a manner similar to that described with respect to FIG. 1. The composite return signals comprising the linear FM components 20 and 21 are applied in parallel to the matched filters 12 and 13. In the instant embodiment, the matched filter 12 comprises a pulse compression filter matched to the waveform segment 20 by having a delay slope characteristic of $T/\Delta f$. Similarly, the matched filter 13 comprises a pulse compression filter matched to the waveform segment 21 by having a delay slope characteristic of $-T/\Delta f$. Numerous circuits for instrumenting the pulse compression filters 12 and 13 are known in the art. For example, suitable circuits are described on pages 9–16 and 413–472 of the said Cook and Bernfeld textbook. Additionally, a suitable pulse compression filter circuit is described in U.S. Pat. No. 3,380,054, "Pulse-type Radar System," by C. E. Cook et al. issued Apr. 23, 1968, and assigned to the assignee of the present invention.

In a manner similar to that described with respect to FIG. 1, the outputs of the pulse compression filters 12 and 13 are applied as inputs to the multiplier 14. The output of pulse compression filter 12 is delayed by an element 16 so that the inputs to multiplier 14 occur at the same instant of time. The multiplier 14 is a conventional circuit for providing the product of its inputs and may be instrumented by any suitable network. For example, the multiplier 14 may comprise a coherent multiplier instrumented as a conventional balanced mixer as disclosed in the Hewlett-Packard Operating and Service Manual for 10534 A/B Mixers, printed May 1967, on page 2, FIG. 2, or in the Relcom Corporation's advertising publication, "Double-Balanced Mixer", Models M6J and M3B, dated July, 1968.

The output of the multiplier 14 is applied to a low-pass filter 22. The low-pass filter 22 performs an envelope detection function in a conventional manner thereby providing the receiver video signals at a terminal 23 for application to the video stages of the radar receiver.

As is known, the segment 20 of the V-FM waveform provides an ambiguity ridge skewed at an angle with respect to the range-Doppler axes of the ambiguity plane. In a similar manner, the segment 21 provides an ambiguity ridge skewed at a different angle from that of the ambiguity ridge associated with the segment 20. The two ridges intersect at the range and Doppler coordinates of the associated target. These ambiguity contours are illustrated in FIGS. 4.13 and 4.15 of the said Cook and Bernfeld textbook. It is thus appreciated that the V-FM waveform provides a spike at the range and Doppler of the target as well as a large number of non-coincident ambiguities over the range-Doppler plane. In the operation of the multiplicative processor 10 of the present invention, since the ambiguities provided by the pulse compression filters 12 and 13 are not coincident in time, the multiplier 14 is effective in removing these ambiguities providing only a spike at the true range and Doppler of the target.

The effectiveness of the V-FM embodiment of the invention illustrated in FIG. 2 in removing ambiguities will now be determined by utilizing the aforementioned resolution function and its associated resolution contours. The resolution function for the V-FM waveform is analytically derived on the basis of the following assumptions:

1. Each segment of the V-FM waveform is a linear FM function of large time-bandwidth product;
2. The auto-correlation function at the output of each of the matched filters 12 and 13 is a $(\sin x)/x$ function; to a good approximation;
3. The pedestal terms of the V-FM ambiguity function due to non-matched slope segments are negligible;
4. The signal-to-noise ratio in each matched filter channel is large.

The second assumption is achieved to a good approximation for $t < 10/\Delta f$. The third assumption follows as a result of the first assumption. The third assumption will also result when there is a frequency separation of the FM segments or when a threshold is imposed prior to or following the multiplier 14. The third assumption is also realized where the V-FM waveform contributions to the pedestal function for each segment are not time-coincident and therefore do not contribute to the multiplicative resolution function.

The inputs to the multiplier 14 from the pulse compression filters 12 and 13 may be expressed respectively as $$g_1(t, \omega_d) = \sqrt{T\Delta f}\, \frac{\sin\left(\dfrac{\omega_d + \mu t}{2}\right) T}{\dfrac{\omega_d + \mu t}{2} T} \cos\left(\omega_0 + \frac{\omega_d}{2}\right) t \quad (1)$$

and $$g_2(t, \omega_d) = \sqrt{T\Delta f}\, \frac{\sin\left(\dfrac{\omega_d - \mu t}{2}\right) T}{\dfrac{\omega_d - \mu t}{2} T} \cos\left(\omega_0 + \frac{\omega_d}{2}\right) t \quad (2)$$

Accordingly, the output from the multiplier 14 may be expressed as $$g_1(t, \omega_d) \times g_2(t, \omega_d)$$

$$= \frac{T\Delta f \sin\left(\dfrac{\omega_d + \mu t}{2}\right) T \sin\left(\dfrac{\omega_d - \mu t}{2}\right) T \cos^2\left(\omega_0 + \dfrac{\omega_d}{2}\right) t}{\dfrac{\omega_d^2 - \mu^2 t^2}{4} T^2} \quad (3)$$

where $\mu$ = the FM sweep factor = $(2\pi \Delta f)/t$, $\omega_d$ = Doppler Frequency and $\omega_0$ = carrier frequency. Using standard trigonometric identities and considering that the high frequency terms are filtered out by the low-pass filter 22, the signal at the low-pass filter output terminal 23 may be expressed as $$R_\pi(t, \omega_d) = \frac{T\Delta f}{4} \frac{\cos \mu t T - \cos \omega_d T}{\left(\dfrac{\omega_d T}{2}\right)^2 - \left(\dfrac{\mu t T}{2}\right)^2} \quad (4)$$

where the term $R_\pi(t, \omega_d)$ is defined as the multiplicative time-frequency resolution function.

Figure 2A:
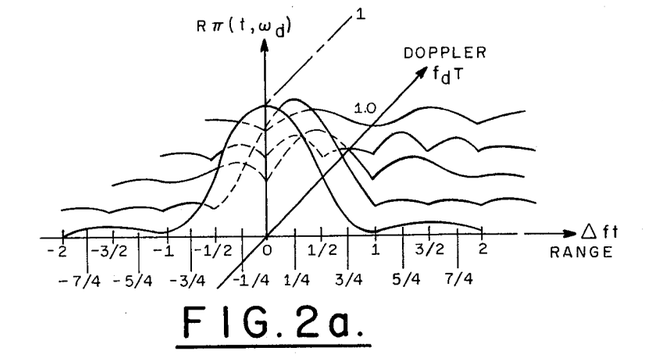
FIG. 2a is the resolution function diagram associated with the embodiment of FIG. 2.

The resolution function for the V-FM waveform as expressed in equation (4) is plotted in FIG. 2a. The resolution contours are graphed in range in units of $\Delta ft$ for purposes of normalization. Similarly, the resolution contours are plotted in Doppler in units of $f_dT$ for the same purpose. It is appreciated from the resolution contours of FIG. 2a that the subsidiary ambiguity ridges of the conventional V-FM ambiguity function, as illustrated in FIG. 4.15 of the said Cook and Bernfeld textbook, are greatly reduced when utilizing the multiplicative processor 10 of the present invention. It is further appreciated that the undesired ambiguity terms can be further reduced if the output of each matched filter 12 and 13 is weighted to reduce the sidelobes of the $(\sin x)/x$ waveforms. This reduction in sidelobes is illustrated by the resolution contours shown in FIG. 2b which are obtained for a gausian envelope linear FM compressed pulse at the output of each of the matched filters 12 and 13. The weighting technique to reduce sidelobes of the resolution function is readily adapted by practitioners in the art from the well-known ambiguity function sidelobe reduction techniques as discussed in detail in chapter 7 of the said Cook and Bernfeld textbook.

Figure 3:
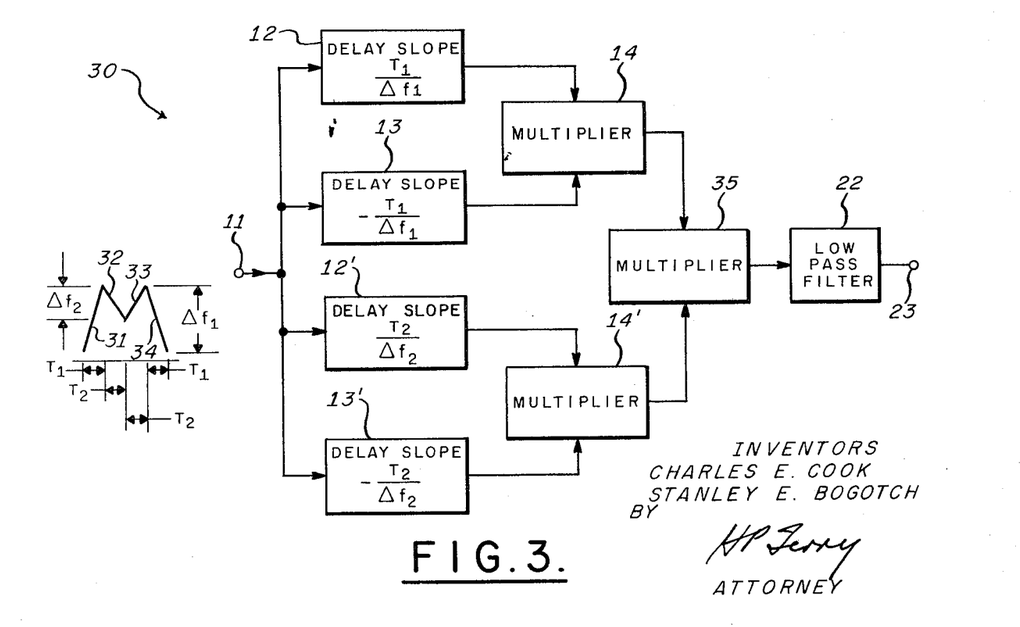
FIG. 3 is a block schematic representation of an embodiment of the invention for use with the M-FM waveform.

Referring now to FIG. 3 in which like reference numerals indicate like components with respect to FIG. 2, a block schematic representation of a multiplicative processor 30 for use with the M-FM waveform is illustrated. The M-FM waveform is similar to the previously described V-FM waveform except that four linearly swept segments are utilized instead of two. The M-FM transmission is a rectangular pulse modulated RF carrier where the carrier is frequency modulated in accordance with segments 31, 32, 33 and 34 as illustrated in FIG. 3. The FM sweep factor for the segments 31 and 34 is $\mu = 4\pi\Delta f_1/T_1$ and the FM sweep factor for the segments 32 and 33 is $\mu = 2\pi\Delta f_2/T_2$. To provide a basis of comparison with the V-FM waveform discussed previously, the total signal duration of the M-FM pulse is maintained at 2T. In order to simplify the resolution function analysis of the M-FM waveform to be later provided, the segments 31, 32, 33 and 34 are presumed to have the same center frequency. In practice, this restriction need not be maintained if the outputs of the channels of the multiplicative processor 30 are multiplied in the proper order.

In a manner similar to that described with respect to FIG. 2, the target echo returns from the M-FM transmission are applied to a terminal 11. The terminal 11 is connected to apply the echo return signals in parallel to matched filters 12, 13, 12' and 13'. The matched filter 12 comprises a pulse compression filter matched to the segment 34 by having a delay slope characteristic of $T_1/\Delta f_1$ in a manner similar to that described with respect to FIG. 2. Similarly, the matched filter 13 comprises a pulse compression filter matched to the segment 31. The matched filters 12' and 13' also comprise pulse compression filters matched to the segments 32 and 33, respectively. The outputs of the pulse compression filters 12 and 13 are applied as inputs to a multiplier 14 and the outputs of the pulse compression filters 12' and 13' are applied as inputs to a multiplier 14' in a manner similar to and for reasons discussed with respect to FIG. 2. In this embodiment it is assumed, that each pulse compression filter 12, 12', 13 and 13' contains the required amount of additional fixed delay so that the desired inputs to the multipliers occur at the same instant in time. Thus, the non-time coincident ambiguities of the segments 31 and 34 are removed by the multiplier 14 and the non-time coincident ambiguities of the segments 32 and 33 are removed by the multiplier 14'.

The outputs of the multipliers 14 and 14' are applied as inputs to a multiplier 35. The multiplier 35, in a manner similar to that described with respect to the multipliers 14 and 14', removes the non-time coincident ambiguities with respect to the segment pairs 31, 34 and 32, 33. The output of the multiplier 35 is applied to the low-pass filter 22 in a manner similar to and for the reasons discussed with respect to FIG. 2. The low-pass filter 22 provides the true target responses at the terminal 23 substantially free from ambiguities similarly to that previously described with respect to FIG. 2.

The resolution function and resolution contours for the M-FM waveform are obtained in a manner similar to that described above with respect to the V-FM waveform. Accordingly, $$R_\pi(t, \omega_d) = \left(\frac{(T\Delta f)^2}{32} \frac{\cos \mu_1 t \frac{T}{2} - \cos \omega_d \frac{T}{2}}{\left(\omega_d \frac{T}{4}\right)^2 - \left(\mu_1 t \frac{T}{4}\right)^2}\right)$$
$$\times \left(\frac{\cos \mu_2 t \frac{T}{2} - \cos \omega_d \frac{T}{2}}{\left(\omega_d \frac{T}{4}\right)^2 - \left(\mu_2 t \frac{T}{4}\right)^2}\right) \quad (5)$$

Figure 3A:
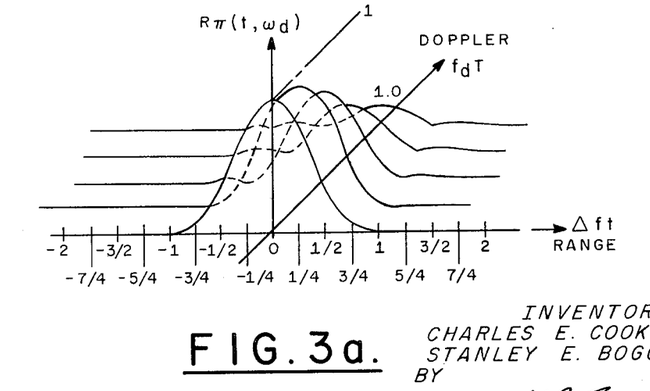
FIG. 3a is the resolution function ssociated with the embodiment of FIG. 3.

The corresponding resolution contours are plotted in FIG. 3a in a manner similar to that described with respect to FIG. 2a.

Figure 2B:
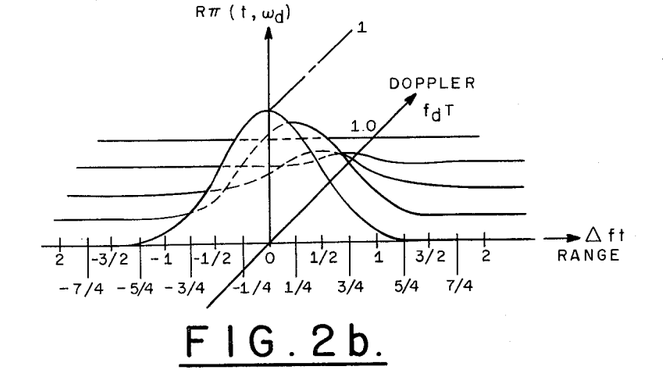
FIG. 2b is the resolution function of FIG. 2a after reduction of sidelobes by weighting.

It is appreciated that by a propitious choice of system parameters the shapes of the resolution contour spikes illustrated in FIGS. 2a, 2b and 3a may be altered in accordance with system requirements.

Figure 4:
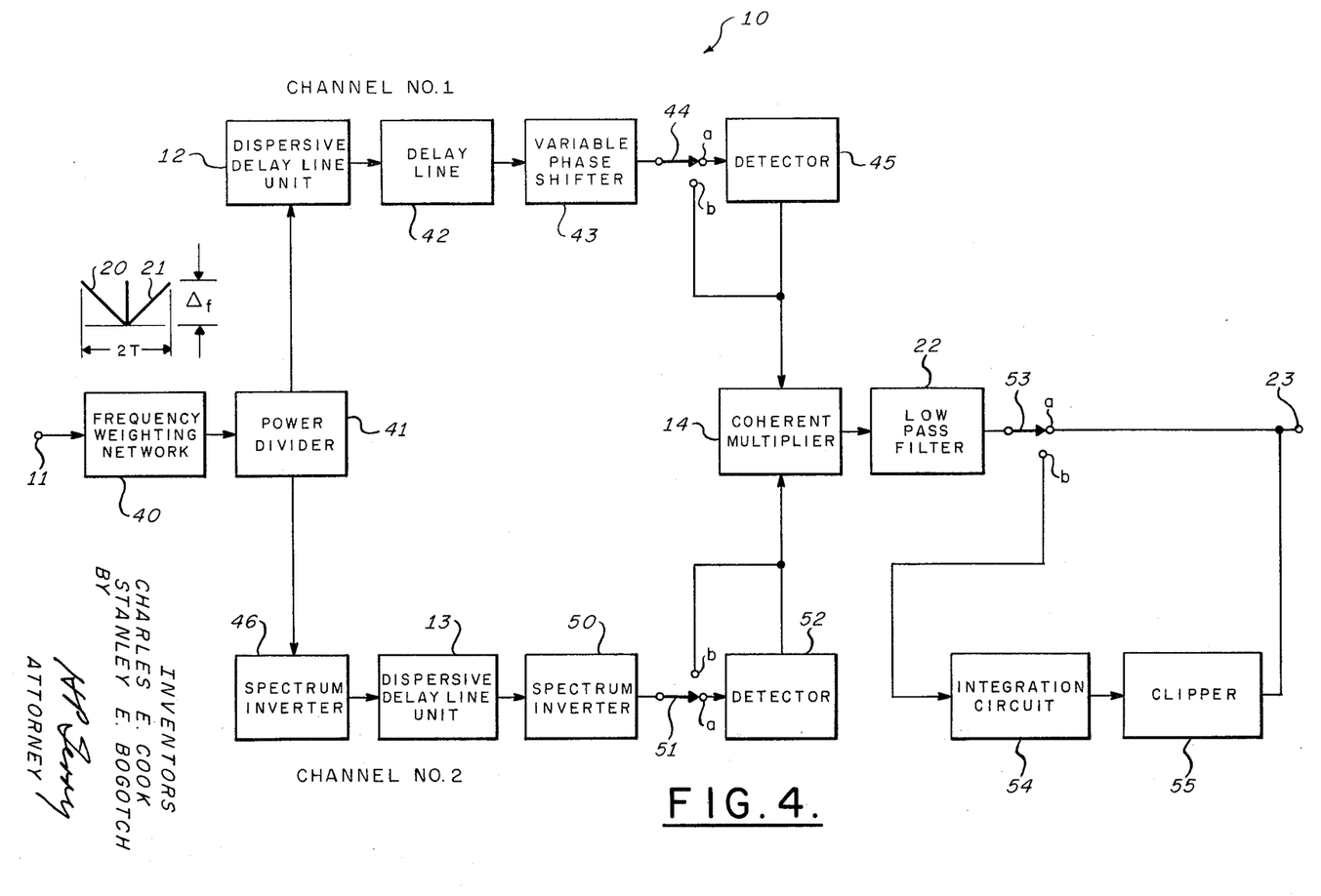
FIG. 4 is a block schematic diagram of an instrumentation of the embodiment of FIG. 2.

Referring now to FIG. 4 in which like reference numerals indicate like components with respect to FIG. 2, a block schematic diagram of a preferred instrumentation of the V-FM multiplicative processor 10 of FIG. 2 is illustrated. As previously discussed, the echo return signals from the transmitted V-FM signal comprised of the segments 20 and 21 are applied to the terminal 11. The terminal 11 is connected to a frequency weighting network 40 which is utilized to reduce the compressed pulse range sidelobes from −13 db to below −20 db as previously discussed and as explained in detail in chapter 7 of the said Cook and Bernfeld textbook. The extent to which the sidelobes can be reduced is limited largely by the group time-delay errors in the dispersive delay lines which follow in the circuit.

The output of the frequency weighting network 40 is applied to a conventional power dividing network 41, which evenly divides the input signal for application to two processing channels designated as channels 1 and 2. The divided signal from the power divider 41 is applied to a pulse compression filter 12 matched to the segment 20 of the V-FM waveform in channel 1. The pulse compression filter 12 may be instrumented, for example, by a conventional dispersive delay line unit which, more specifically, may comprise a metallic strip dispersive delay line. Such devices are well known in the art and are explained in detail in Chapter 13 in the said Cook and Bernfeld textbook.

The compressed pulse output of the dispersive delay line unit 12 is applied to a delay line 42, which for example may be instrumented as a conventional quartz delay device. The delay line 42 is utilized to adjust the output of channel 1 to be in time coincidence with the output of channel 2. Delays between the two channels may occur as result of different transmission times of the segments 20 and 21 of the transmitted V-FM waveform. Additional delay time differences between the channels occur as a result of target Doppler frequency shifts. It is thus appreciated that an array of delay lines 42 may be utilized to match a respective plurality of Doppler channels of interest. The output of the delay line unit 42 is applied to a variable phase shifter 43. The phase shifter 43 is used to trim out any phase difference between the channels due to inherent phase shifts introduced by the components utilized in instrumenting the circuit.

The output of the variable phase shifter 43 is applied to a switch 44 which may be selectively set to either a contact 44a or a contact 44b. When the switch 44 is set to position a, the variable phase shifter 43 is coupled to a coherent multiplier 14 via a conventional envelope detector 45. When the switch 44 is set to position b, the output of the variable phase shifter 43 provides an input directly to the multiplier 14. The functions of the switch 44 and the detector 45 will be later explained.

The second output of the power divider 41 is applied through a spectrum inverter 46 to a dispersive delay line unit 13 which is identical to the dispersive delay line unit 12 previously described. Since the metallic strip dispersive delay line utilized can only have a position slope of time delay versus frequency and channel 2 requires a negative slope so as to match the segment 21 of the V-FM waveform, the spectrum inverter 46 must be utilized to invert the frequency spectrum of the input signal so as to provide the required match. Since the spectrum inverter 46 introduces time varying terms into the channel 2 phase shift characteristic, a second spectrum inverter 50 connected to the output of the delay line unit 13 is utilized so that the overall behavior of the channel is time invariant. The spectrum inverters 46 and 50 are conventional circuits that may be instrumented in a manner similar to that disclosed in U.S. Pat. No. 3,400,396, "Pulse Stretching And Compression Radar System," by C. E. Cook et al. issued Sept. 3, 1968, and assigned to the assignee of the present invention.

The output of the spectrum inverter 50 is applied to a switch 51 which may be set to either a contact 51a or a contact 51b. When the switch 51 is set to the contact 51a, the output of the spectrum inverter 50 is coupled as an input to the coherent multiplier 14 via a conventional envelope detector 52. When the switch 51 is set to its contact 51b, the output of the spectrum inverter 50 provides an input directly to the multiplier 14. The functions of the switch 51 and the detector 52 will be later explained.

The output of the coherent multiplier 14 is applied to the terminal 23 via the low pass filter 22 in a manner similar to and for the reasons given with respect to FIG. 2. The output of the low pass filter 22, is however, applied to a switch 53 having contacts 53a and 53b. When the switch 53 is set to the contact 53a, the output of the low pass filter 22 is connected directly to the terminal 23. When the switch 53 is set to the contact 53b, the output of the low pass filter 22 is connected to the terminal 23 via serially connected integration circuit 54 and clipper 55. The function of the integration circuit 54 and the clipper 55 will be later explained.

With the switches 44 and 51 set to their respective contacts b and the switch 53 set to its contact a, the multiplicative processor 10 provides an output at the terminal 23 in response to the transmitted V-FM waveform that is representative of the range and Doppler of true targets and is substantially free of ambiguities. This is achieved in the manner previously described with respect to FIG. 2 and will not be repeated here for brevity.

In the foregoing descriptions and analyses, the effects of Doppler frequency shifts due to target velocities were not considered. These effects will now be discussed in detail. In the V-FM multiplicative processor 10 of FIG. 4, the compressed pulses applied as inputs to the multiplier 14 have phase constants associated with the carriers thereof that are functions of Doppler shift. Accordingly, the carrier terms $\cos[\omega_0+(\omega_d/2)]t$ of $g_1(t, \omega_d)$ and $g_2(t, \omega_d)$ given by equations (1) and (2) above, should be written as $$\cos\left[\left(\omega_0 + \frac{\omega_d}{2}\right)t - \frac{\omega_d T}{2}\right] \qquad (8)$$

$$\cos\left[\left(\omega_0 + \frac{\omega_d}{2}\right)t + \frac{\omega_d T}{2}\right] \qquad (9)$$

When the carrier terms of the expressions (8) and (9) are used in equations (1) and (2), the output from the low pass filter 22 becomes $$R_\pi(t, \omega_d) = T\Delta f \left(\frac{\cos \mu t T - \cos \omega_d T}{(\omega_d T)^2 - (\mu t T)^2}\right) \cos \omega_d T \qquad (10)$$

Figure 5:
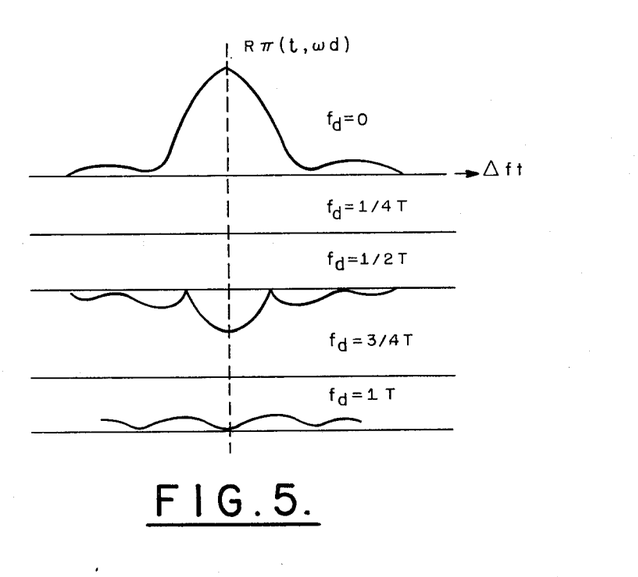
FIG. 5 is a resolution function diagram associated with FIGS. 2 and 4 when the detected target introduces Doppler shift into the received carrier.

The $\cos \omega_d T$ term in equation (8) causes the resolution function $R_\pi(t, \omega_d)$ to be bipolar in nature. That is, the resolution contours can be either positive or negative in accordance with the Doppler frequency $\omega_d$. The consideration of the Doppler velocities of targets for the V-FM waveform results in the resolution function cuts illustrated in FIG. 5 rather than those previously shown with respect to FIG. 2a. The bipolar resolution function characteristic illustrated in FIG. 5 is undesirable since signal returns that have Doppler shifts near $\omega_d = \pi/2T$ and $\omega_d = 3\pi/2T$ will be lost. In addition, the negative resolution contours will result in negative video signals that cannot be utilized in a practical radar system. This is so because the negative-going signals are not effective in intensifying the electron beam of the types of radar displays designated as a B-display or PPI thereby causing a further loss of target information. This disadvantage can be obviated in the multiplicative processor 10 of FIG. 4 by setting the switches 44 and 51 to their respective contact a, thereby applying the compressed pulses in the channels 1 and 2 to the multiplier 14 through the envelope detectors 45 and 52 respectively. In this manner, the adverse Doppler phase information is removed prior to multiplication, hence resulting in the uni-polar resolution function envelopes illustrated in FIGS. 2a and 2b.

It has heretofore been shown that the V-FM and the M-FM multiplicative resolution functions have good range-doppler resolution characteristics and indeed more closely resemble a spike or low-level thumbtack function than the ambiguity functions of their respective conventional linearly processed waveforms. In order, however, for the multiplicative processor of the present invention to provide advantages over prior art circuits in multitarget radar environments, the false targets that are caused by the multiplicative processor should be substantially less than those caused by the conventional ambiguity function.

Figure 6:
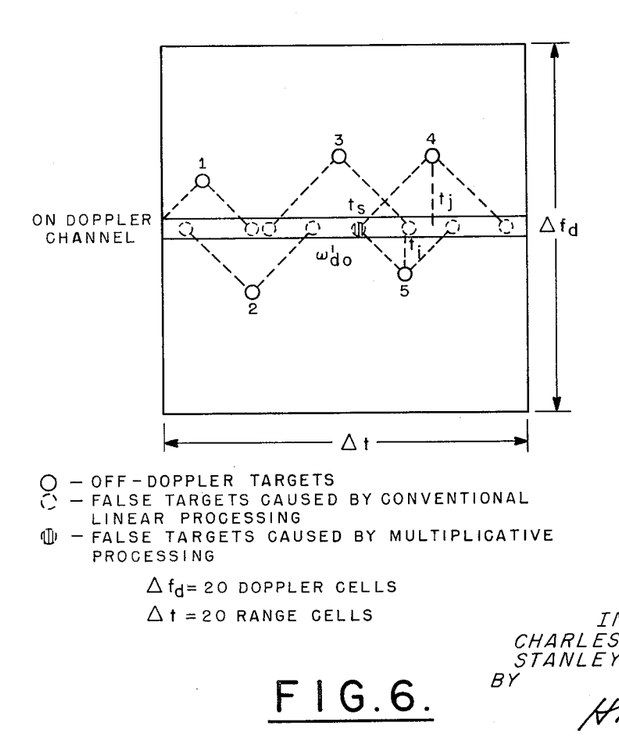
FIG. 6 is an ambiguity diagram illustrating false target generation.

Referring to FIG. 6, a section of the ambiguity plane that illustrates how false targets are created using the V-FM waveform in both the conventional linear processing and the multiplicative processing arrangements, is depicted. The central strip designated as $\omega_{do}$ represents a Doppler channel of interest, i.e. an on-Doppler channel. In the instance of conventional linear processing, it is appreciated that the off-Doppler targets 1 through 5 inject false or spurious responses into the on-Doppler channel. It is further appreciated that only targets 4 and 5 are situated so as to produce a spurious response in the on-Doppler channel at the multiplicative processor output. Hence, the condition for a multiplicative false target response at a position $t_s$ in the on-Doppler strip is that at least one target exist in each of the crossing bounded regions, defined by the V-FM ambiguity function, that pass through $t_s$. For two targets designated as $i$ and $j$, this condition results in the following relationship between the target locations $t_i$ and $t_j$ relative to $t_s$, and their respective Doppler shifts.

$$t_i - t_j = \Delta t_{ij} = (T/\Delta f)(f_{di} + f_{dj}) \quad (11)$$

The condition for which the false target remains in the on-Doppler channel with all of the characteristics of a desired signal, is given by $$\Delta t_{ij} = (2f_{di}/\Delta f)T \quad (12)$$

or, two targets in the same off-doppler channel separated by the interval $(2f_{di}/\Delta f)T$.

The spurious responses caused by conventional linear processing are substantially indistinguishable from true targets in the on-Doppler channel. With the multiplicative processor of the present invention, however, since the off-Doppler targets that contribute to the residual multiplicative spurious responses are generally traveling at different velocities, the false target indications will fade in and out in a random fashion. The duration designated as $T_{fl}$ for which any particular false target persists in a specified range cell is related to the velocity difference of the contributing off-Doppler targets. Specifically when the velocity difference increases, the duration $T_{fl}$ decreases. This fading phenomenon may be employed in target detection systems utilizing the multiplicative processor of the present invention for discriminating against spurious target responses.

Referring again to FIG. 4, it will now be shown that in addition to the relatively slow target fading phenomenon, another property exists at the output of the coherent multiplier 14 that permits further discrimination against spurious targets. The output of the coherent multiplier 14 may be expressed as $$E_1 \cos[\omega_0 + (\omega_{d1}/2)]t \cdot E_2 \cos[\omega_0 + (\omega_{d2}/2)]t \quad (13)$$

where $E_1$ and $E_2$ are envelope terms and where the Doppler sensitive phase constant has been neglected for simplicity of analysis. Accordingly, the signal from the low pass filter 22 may be expressed as $$(E_1 E_2/2) \cos[1/2(\omega_{d1} - \omega_{d2})]t \quad (14)$$

Equation (14) indicates that the spurious responses, when utilizing coherent multiplication, will appear as bipolary video signals where the polarities of the video pulses vary as a function of time. Equation (14) further indicates that real target responses will appear as unipolar video signals. This property of the false target signals permits further discrimination against them by video integration techniques. Since the Doppler velocity difference $\omega_{d1} - \omega_{d2}$ increases as the duration $T_{fl}$ decreases, there will always be a sufficient number of plus and minus samples of a false target signal to reduce the spurious response level. In fact, this level should approach zero as the number of video pulses integrated increases.

The multiplicative processor 10 of FIG. 4 advantageously utilizes the bipolar nature of the video pulses associated with false targets by positioning the switches 44, 51 and 53 to their respective $b$ contacts. In this manner, the detectors 45 and 52 are bypassed and the serially arranged integration circuit 54 and clipper 55 are connected between the low pass filter 22 and the terminal 23. It is appreciated that the integration circuit t4 integrates the bipolar video pulses associated with a false target substantially to zero and accumulates the unipolar video signals associated with a true target passing the true target signals through the clipper 55 to the output terminal 23. Since the detectors 45 and 52 are bypassed in this mode of operation, the true target outputs may be either positive or negative in accordance with the bipolar nature of the resolution function when utilizing coherent multiplication as discussed above. The clipper 55 is utilized to pass only the positive signals since the negative signals are ineffective in intensifying the electron beam of the radar B-type or PPI displays as previously explained. This arrangement has the effect of making the effective Doppler resolution of the multiplicative processor 10 less than $\pm 1/4T$, for the V-FM case, which is a substantial improvement over that of the resolution function envelope alone.

It is to be appreciated that the clipper 55 may or may not be utilized between the integration circuit 54 and the terminal 23 dependent on system requirements. It is further appreciated that a clipper may be connected between the contact $a$ of the switch 53 and the terminal 23 for the reasons given with respect to the clipper 55.

It is appreciated from the foregoing that with the switches 44, 51 and 53 in the $a$ positions, the undesirable bipolar nature of the resolution function illustrated in FIG. 5 is eliminated and the processor provides signals in accordance with the resolution function of FIG. 2a. With this arrangement, however, the integration circuit 54 cannot be effective in discriminating against spurious targets. conversely, however, with the switches 44, 51 and 53 in the $b$ positions, the integration circuit 54 may be utilized, as described above, in false target discrimination but target information is lost due to the bipolar nature of the resolution function of FIG. 5 as previously discussed.

The modes of operation of the multiplicative processor 10 of FIG. 4 are selected by the switches 44, 51 and 53 in accordance with the radar environment in which the circuit is expected to operate. For example, in a dense target environment it may be desirable to utilize the integration circuit 54 to discriminate against false targets. In a sparse target environment, however, the switches 44, 51 and 53 may be positioned to their $a$ contacts since few false target signals will be generated. With this arrangement, the response of the processor 10 is increased since the integration circuit 54 is bypassed.

Figure 7:
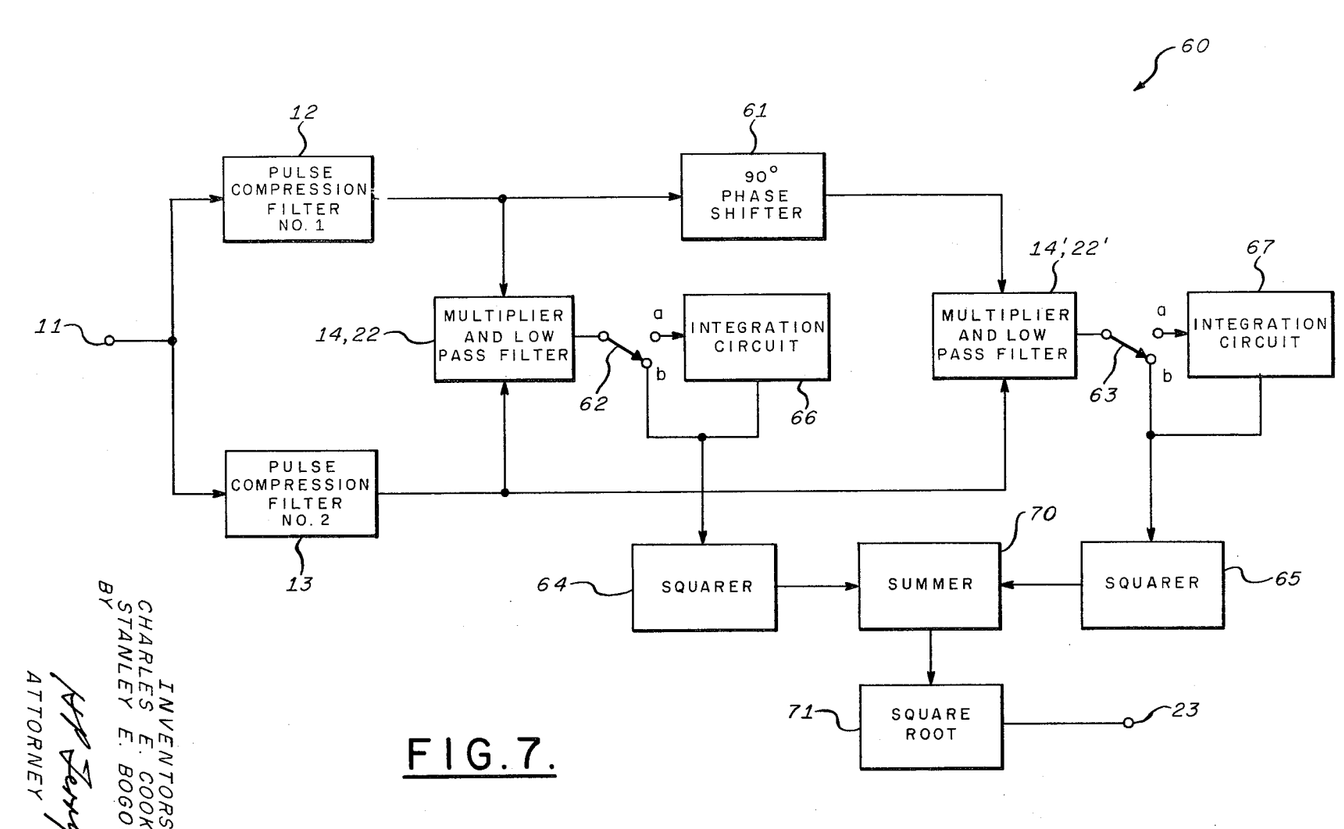
FIG. 7 is a block schematic representation of a quadrature channel embodiment of the invention offering advantages over the embodiment of FIG. 4.

Referring now to FIG. 7, in which like reference numerals indicate like components with respect to FIG. 4, a quadrature channel multiplicative processor 60 is illustrated that provides certain advantages over the embodiment of FIG. 4. The quadrature channel multiplicative processor 60 permits the simultaneous elimination of the undesired bipolar nature of the resolution function of FIG. 5 and the use of integration to discriminate against spurious targets as discussed above.

The target echo returns are applied to the terminal 11 and processed in the pulse compression filters 12 and 13 and in the multiplier and low pass filter 14, 22 as previously discussed with respect to FIG. 4. In addition, the output of the pulse compression filter 13 is applied to a serially connected multiplier and low pass filter 14', 22'. It is appreciated that the multiplier and low pass filter 14', 22' are identical to the multiplier 14 and the low pass filter 22 illustrated in FIG. 4. The output of the pulse compression filter 12 is applied to the multiplier 14' via a 90° phase shifter 61. The phase shifter 61 is a conventional circuit designed to have a frequency bandwidth that covers the frequency spectrum of the compressed pulses from the pulse compression filter 12.

The output of the low pass filter 22 is applied to a switch 62 having contacts 62$a$ and 62$b$. Similarly, the output of the low pass filter 22' is applied to a switch 63 having contacts 63$a$ and 63$b$. With the switches 62 and 63 in their respective $b$ positions, the outputs of the low pass filters 22 and 22' are connected directly to squaring circuits 64 and 65, respectively. With the switches 62 and 63 in their respective $a$ positions, the low pass filters 22 and 22' are connected to the squaring circuits 64 and 65 via integration circuits 66 and 67, respectively. The outputs of the squaring circuits 64 and 65 are applied as inputs to a summing circuit 70, the output of which is connected as an input to a square root circuit 71. The square root circuit 71, in turn, provides video signals at the terminal 23 to the video circuits of the radar receiver. It is appreciated that the components 64, 65, 70 and 71 provide the square root of the sum of the squares of the signals applied to the circuits 64 and 65.

The manner in which the quadrature channel multiplicative processor 60 of FIG. 7 operates to remove the undesired bipolar characteristics of the resolution function illustrated in FIG. 5 is appreciated by referring again to equation (10) above. As previously explained, equation (10) represents the signal from the low pass filter 22 where the cos $\omega_d t$ term causes the bipolar characteristic of the resolution function. The output of the low pass filter 22' may also be expressed by equation (10) except that the phase shifter 61 converts the cos $\omega_d t$ term to a sin $\omega_d t$ term. The squaring circuit 64 consequently provides a term cos$^2$ $\omega_d t$ and the squaring circuit 65 provides a sin$^2$ $\omega_d t$. The summer 70 generates the expression cos$^2$ $\omega_d t$ + sin$^2$ $\omega_d t$ which is known to be unity. Hence, it is appreciated that the quadrature channel multiplicative processor 60 removes the troublesome cos $\omega_d t$ term thus eliminating the undesired bipolar characteristic of the resolution function when utilizing coherent multiplication.

Since coherent multiplication is utilized in the quadrature channel multiplicative processor 60, the integration circuits 66 and 67 may be connected into the circuit by the switches 62 and 63 for the purpose of false target discrimination as explained above with respect to FIG. 4.

It is appreciated from the foregoing that the scope of the invention covers the use of any suitable composite signal. For example, a species of the invention having unique and desirable characteristics with respect to clutter rejection may be found in copending patent application Ser. No. 807,689, "Signal Processor For Reducing Clutter and Eliminating Range Ambiguities In Target Detection Systems," by Chester A. Palmieri filed Mar. 17, 1969, and assigned to the assignee of the present invention.

It is further appreciated that composite pseudo-random waveforms or non-linear FM may also be utilized in practicing the invention. Additionally, although the above described embodiments of the invention are explained in terms of two and four segment linear FM waveforms, it is appreciated that the concepts of the invention are applicable to signal processors for composite waveforms that comprise any finite number of segments. The outputs of the pulse compression filters matched to the segments, respectively, may be arranged in pairs and applied as inputs to a plurality of multipliers. The outputs of the multipliers may also be arranged in pairs and applied as inputs to further multipliers. The last multiplier in the arrangement provides the output signal of the processor in a manner similar to that described with respect to FIG. 3.

It is additionally appreciated that when utilizing the conventional linear processing of the V-FM waveform, as described on pages 96–100 of the said Cook and Bernfeld textbook, all of the ambiguities are retained. It is by utilizing the multiplicative processor of the present invention that the large numbers of significant magnitude ambiguities are removed. The detection loss associated with the processor of the present invention is very small (approximately 0.5 db). Furthermore, since relatively simple waveforms such as linear FM segments and uniform pulse bursts are suited to the present invention, practical implementations of the device are relatively inexpensive.

The multiplier 14 of the present invention broadly performs the function of coincidence detection. It is therefore to be appreciated that the term "multiplier" as used herein is defined to include the class of coincidence detection circuits.

While the invention has been described in its preferred embodiments, it is to be understood that the words which have been used are words of description rather than limitation and that changes may be made within the purview of the appended claims without departing from the true scope and spirit of the invention in its broader aspects.

We claim:

1. In a system for detecting targets by transmitting a composite signal having first and second components and processing the composite signals reflected from said targets, said first and second components having respective ambiguity functions with non-time overlapping range-doppler ambiguities with respect to each other when the respective desired responses thereof with respect to each target are time coincident, the combination comprising first enhancing means responsive to said reflected composite signals or selectively enhancing said first component for providing a first enhanced signal, second enhancing means responsive to said reflected composite signals for selectively enhancing said second component for providing a second enhanced signal, and multiplying means responsive to said first and second enhanced signals for providing an output signal representative of the product thereof.

2. In the system of claim 1 in which said composite signal comprises a V-FM waveform composed of first and second linear FM segments, and said first enhancing means comprises first matched filter means matched to said first segment.

3. In the system of claim 2 in which said first matched filter means comprises first pulse compression means.

4. In the system of claim 3 in which said first pulse compression means comprises a delay line pulse compression filter.

5. In the system of claim 3 in which said second enhancing means comprises second pulse compression means matched to said second segment.

6. In the system of claim 1 in which said first multiplying means comprises a coherent multiplier.

7. In the system of claim 6 further including low pass filter means responsive to said output signal for providing a signal representative of the envelope thereof.

8. In the system of claim 7 further including integration means coupled to said low pass filter means for integrating said envelope signals thereby diminishing false target signals.

9. In the system of claim 6 further including first and second envelope detector means coupled between said first and second enhancing means and said coherent multiplier, respectively.

10. In a system for detecting targets by transmitting a composite signal comprised of an M-FM waveform composed of first, second, third and fourth linear FM segments, and processing the composite signals reflected from said target, the combination comprising first, second, third and fourth pulse compression filter means matched to said first, second, third and fourth linear FM segments for providing first, second, third and fourth compressed pulse signals, respectively, first multiplying means responsive to said first and second compressed pulse signals for providing a first product signal representative of the product thereof, second multiplying means responsive to said third and fourth compressed pulse signals from providing a second product signal representative of the product thereof, and third multiplying means responsive to said first and second product signals for providing an output signal representative of the product thereof.

11. In a system for detecting targets by transmitting a composite signal comprised of a V-FM waveform composed of first and second linear FM segments and processing the composite signals reflected from said targets, the combination comprising first and second pulse compression filter means matched to said first and second segments for providing first and second compressed pulse signals, respectively, first coherent multiplying means responsive to said first and second compressed pulse signals for providing a first product signal representative of the product thereof, first low pass filter means responsive to said first product signal for providing a first envelope signal representative of the envelope thereof, phase shifting means responsive to said first compressed pulse signal or shifting the phase thereof by 90° thereby providing a phase shifted first compressed pulse signal, second coherent multiplying means responsive to said phase shifted first compressed pulse signal and said second compressed pulse signal for providing a second product signal representative of the product thereof, second low pass filter means responsive to said second product signal for providing a second envelope signal representative of the envelope thereof, first squaring means responsive to said first envelope signal for providing a first squared signal representative of the algebraic square thereof, second squaring means responsive to said second envelope signal for providing a second squared signal representative of the algebraic square thereof, summer means responsive to said first and second squared signals for providing a sum signal representative of the algebraic sum thereof, and square root means responsive to said sum signal for providing an output signal representative of the square root thereof.

12. In the system of claim 11 further including first integrating means coupled between said first low pass filter means and said first squaring means for integrating said first envelope signal, and second integrating means coupled between said second low pass filter means and said second squaring means for integrating said second envelope signal, thereby diminishing false target signals.

13. In a system for detecting targets by transmitting a composite signal comprised of a plurality of linear FM segments and processing the composite signals reflected from said target, the combination comprising a plurality of pulse compression filter means matched to said plurality of linear FM segments for providing a plurality of compressed pulse signals, respectively, a plurality of multiplying means responsive to pairs of said compressed pulse signal for providing a plurality of product signals representative of the products thereof, respectively, a further plurality of multiplying means responsive to pairs of said plurality of product signals for providing a plurality of further product signals representative of the products thereof, respectively, and additional multiplying means responsive to said plurality of further product signals the last multiplying means in the arrangement providing the output signal of said combination.

* * * * *